(12) United States Patent
Glasgow et al.

(10) Patent No.: US 7,116,071 B2
(45) Date of Patent: *Oct. 3, 2006

(54) POWER TOOL AND MOTOR CONTROLLER

(75) Inventors: Kevin L. Glasgow, Campbellsport, WI (US); Robert M. Crisp, Mukwonago, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/996,564

(22) Filed: Nov. 23, 2004

(65) Prior Publication Data

US 2005/0127862 A1 Jun. 16, 2005

Related U.S. Application Data

(63) Continuation-in-part of application No. 10/152,059, filed on May 21, 2002, now Pat. No. 6,823,134, which is a continuation of application No. 09/731,438, filed on Dec. 6, 2000, now Pat. No. 6,119,903.

(51) Int. Cl.
*H02P 1/00* (2006.01)

(52) U.S. Cl. .................. 318/280; 318/281; 318/256; 318/282; 222/1; 222/144

(58) Field of Classification Search ............... 388/937, 388/17, 280; 222/144; 318/280, 256, 10, 318/281, 282
See application file for complete search history.

(56) References Cited

U.S. PATENT DOCUMENTS

| 3,604,597 | A | * | 9/1971 | Pohl et al. ............... 222/146.5 |
| 4,085,508 | A | * | 4/1978 | Gyongyosi ................. 33/27.12 |
| 4,615,469 | A | * | 10/1986 | Kishi et al. ................. 222/327 |
| 4,949,605 | A | * | 8/1990 | Geller et al. ................... 82/46 |
| 4,953,292 | A | * | 9/1990 | Tobey ............................ 30/97 |
| 5,747,953 | A | * | 5/1998 | Philipp ....................... 318/139 |
| 5,775,539 | A | * | 7/1998 | Bates et al. .................... 222/1 |
| 5,836,079 | A | * | 11/1998 | Cronin et al. ................ 30/101 |
| 5,943,778 | A | * | 8/1999 | Alana .......................... 30/101 |
| 5,964,378 | A | * | 10/1999 | Sperry et al. ............ 222/145.2 |
| 6,013,991 | A | * | 1/2000 | Philipp ....................... 318/139 |
| 6,042,262 | A | * | 3/2000 | Hajianpour ................. 366/139 |
| 6,540,113 | B1 | * | 4/2003 | Gardos ....................... 222/137 |

* cited by examiner

*Primary Examiner*—Rita Leykin
(74) *Attorney, Agent, or Firm*—Michael Best & Friedrich LLP

(57) ABSTRACT

A method and apparatus to automatically reverse the motor of a power tool, such as a dispensing gun or similar tool. In some constructions, a controller automatically reverses the direction of plunger movement and removes the plunger from contact with the back wall of a cartridge. The controller has a trigger switch that is coupled to a power source, such as a battery, and includes a main power on/off switch and a potentiometer. A protection or secondary switch is coupled in parallel to the main power on/off switch. A power supply circuit and a commutator are each coupled to the main and secondary switches. An overload sensor is coupled to the commutator. The controller includes a programmable device that is coupled to the power supply circuit, the potentiometer, the commutator, and the overload sensor. The programmable device is operable to sense actuation and deactuation of the main power on/off switch, read an electromotive force from the potentiometer, and, upon sensing deactuation of the main switch, send a control signal to the commutator to reverse current flow therethrough for a predetermined amount of time, and deactuate the secondary switch when the predetermined time has lapsed.

15 Claims, 13 Drawing Sheets

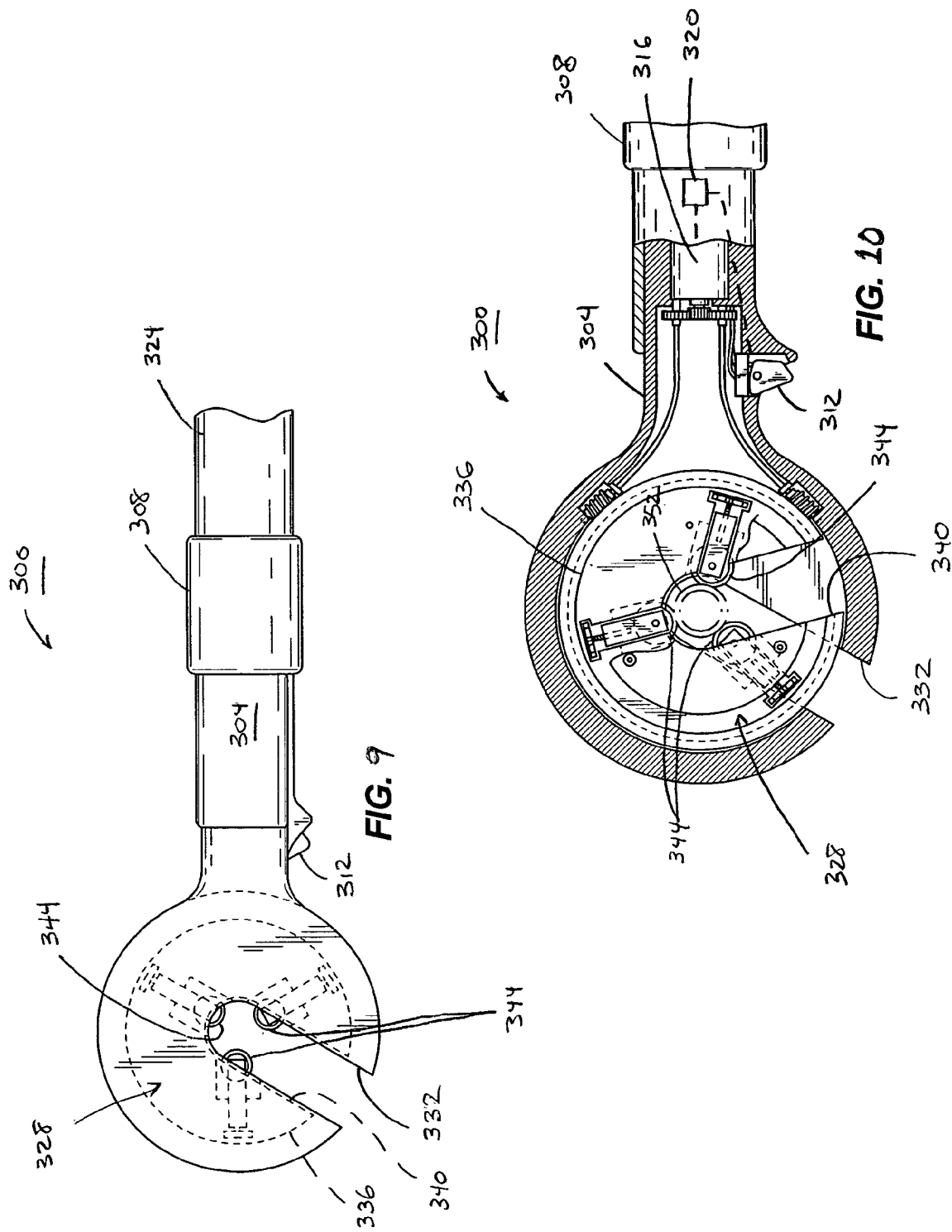

POWER TOOL AND MOTOR CONTROLLER

RELATED APPLICATIONS

This application is a continuation-in-part of U.S. patent application Ser. No. 10/152,059, filed May 21, 2002 now U.S. Pat. No. 6,823,134, which is a continuation of U.S. patent application Ser. No. 09/731,438, filed Dec. 6, 2000, now U.S. Pat. No. 6,119,903, issued May 21, 2002. The contents of application Ser. No. 10/152,059 and of U.S. Pat. No. 6,119,903 are hereby incorporated by reference in their entirety.

SUMMARY OF THE INVENTION

The present invention generally relates to methods and devices used to control electric motors. More particularly, the invention relates to methods and apparatus to automatically reverse an electric motor to control the operation of a tool, such as, for example, a dispensing gun, a tube cutter, a saw, etc., driven by the motor.

Hand powered dispensing guns have been available for many years. More recently, pneumatic and electric versions of hand-powered dispensing guns have been made available. Most dispensing guns, whether hand-powered, pneumatic, or electric, operate in a similar manner. A cartridge of material is placed in a cradle of the gun. The cartridge has a nozzle on one end and a disk or back wall on the other. The gun includes a plunger that is positioned coaxially with the back wall when the cartridge is placed in the cradle. The plunger contacts the back wall and moves it forward forcing the material in the cartridge out of the nozzle.

Electric-corded and battery-powered dispensing guns include an electric motor controlled by a trigger-actuated switch. Pulling the trigger closes the switch and electrically interconnects the motor to the power source. The motor drives a rack and pinion mechanism to advance the plunger. The plunger is thereby driven into the back wall of the cartridge to dispense the material. The operator can control the advancement of the plunger into the material cartridge and, thereby, control the application of material to the desired surface. Powered dispensing guns typically incorporate a speed control mechanism that allows the operator to control the speed of the flow of material out of the cartridge nozzle. As the operator becomes proficient with the tool, he or she can increase the speed at which the material is dispensed. The operator typically also has the option of retracting the plunger from the back wall of the cartridge. Operators remove the plunger from the cartridge when the cartridge is empty or when the job has been completed. Some dispensing guns have a manual switch to change the direction of the motor, thereby changing the direction of the plunger and retracting it away from the cartridge. Other dispensing guns have a manual mechanical release that allows the operator to physically pull the plunger out of contact with the cartridge.

While present dispensing guns are functional, they suffer from at least one deficiency. In general, once material is dispensed from a dispensing gun the material continues to flow out of the gun's nozzle after the gun's trigger mechanism has been released. After-flow (or oozing at the dispensing tip) leads to waste of material, nozzle fouling, dropped material, and additional clean up time.

Two primary reasons for the after-flow phenomenon are recognized. First, the usually thin-walled cartridge expands during plunger actuation and, according to the physical law that systems always attempt to return to the relaxed state, the cartridge wall relaxes after the plunger actuation. Since the back walls of most cartridges are designed to retain their forward-most position and the plunger of the dispensing gun is typically locked against a return movement, the relaxation of the cartridge wall leads to after-flow. Second, most dispensed compositions have a high viscosity and are at least marginally compressible. Thus, plunger actuation usually causes a substantial internal pressure buildup in the cartridge that, after the plunger is no longer forced forward, results in material leaking from the nozzle tip.

Accordingly, it would be desirable to have an improved method and device to control after-flow in a dispensing gun. In some aspects and in some constructions, the invention provides a method and apparatus to automatically reverse the motor of a dispensing gun for a predetermined amount of time. An electronic motor controller automatically reverses the direction of plunger movement and removes the plunger from contact with the back wall of the cartridge. The automatic reversal of the motor to reverse plunger motion alleviates after-flow problems. The electronic motor controller includes a trigger switch, a power supply circuit, a commutator, an overload sensor, and a programmable device.

The trigger switch is coupled to a power source, such as a battery, and includes a main power on/off switch and a potentiometer. A protection or secondary switch is coupled in parallel to the main switch. The power supply circuit and the commutator are each coupled to the main and secondary switches. The overload sensor is coupled to the commutator and the programmable device. The programmable device is coupled to the power supply circuit, the potentiometer, the commutator, and the overload sensor. The programmable device is operable to sense actuation and deactuation of the main power on/off switch, read an electromotive force from the potentiometer, and, upon sensing deactuation of the main switch, send a control signal to the commutator to reverse current flow therethrough for a predetermined amount of time. The programmable device also deactuates the secondary switch when the predetermined time has lapsed. Reversing the direction of the motor upon release of the trigger switch reverses the direction of the plunger and stops forward movement of the back wall of the cartridge in the dispensing gun. As noted, automatically stopping the forward movement of the back wall alleviates after flow problems.

In some aspects and in some constructions, the invention may also be implemented in a method including sensing actuation of the trigger switch, reading a voltage from the trigger switch, generating a first control signal if the voltage from the trigger switch is equal to or greater than a predetermined value, sending the first control signal to a commutator to drive an electric motor in a first direction, generating a second control signal if the voltage from the trigger switch is equal to or less than a predetermined cut-off value, sending the second control signal to the commutator to drive the electric motor in a second direction, opposite the first direction, for a predetermined amount of time, and deactuating the secondary switch when the predetermined time has lapsed.

As is apparent from the above, it is an independent advantage of the present invention to provide an electronic motor control to automatically reverse a motor to prevent after-flow of material from a tool such as a dispensing gun.

Other independent features and independent advantages of the present invention will become apparent by consideration of the detailed description and accompanying drawings.

BRIEF DESCRIPTION OF THE DRAWINGS

FIG. 9 is a side partial cross-sectional view of another alternate construction of power tool, such as a tube cutter, illustrated in a first condition.

FIG. 10 is a side partial cross-sectional view the power tool shown in FIG. 9 illustrated in a second condition.

DETAILED DESCRIPTION

Figure 1:
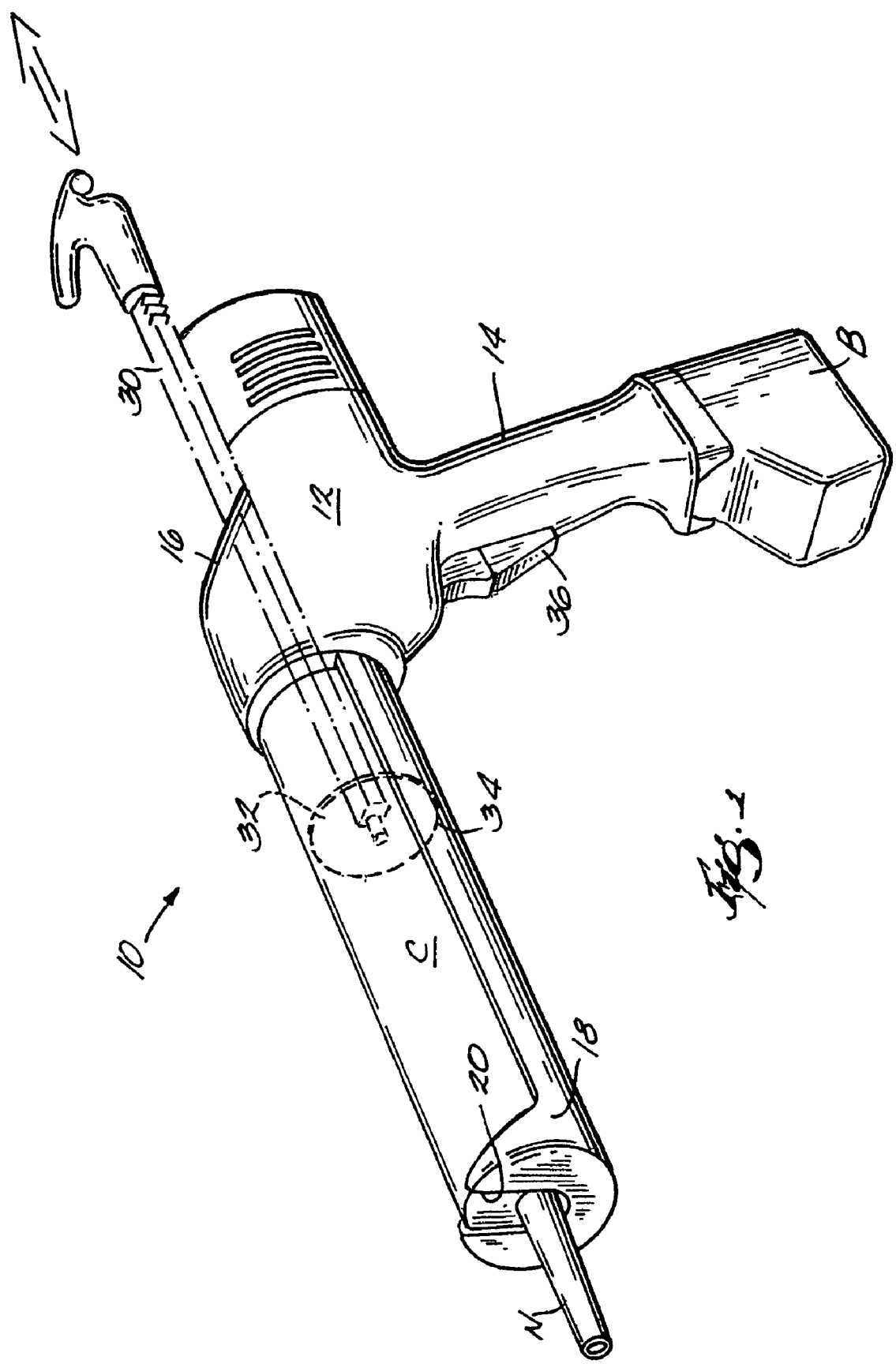
FIG. 1 is a perspective view of a power tool, such as a battery-powered dispensing gun.

Before any embodiments of the invention are explained in detail, it is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

In addition, it should be understood that at least some embodiments of the invention include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible.

A power tool, such as, for example, a dispensing gun 10, incorporating a motor controller embodying one or more independent aspects of the invention is illustrated generally in FIG. 1. As shown, the dispensing gun 10 includes a pistol-shaped housing 12, including a handle 14 and a drive enclosure 16, and a sleeve or cradle 18 that extends from the drive enclosure 16. The cradle 18 is sized to receive commercially available tubes or cartridges of caulk, adhesive, and other similar materials. The cradle 18 includes an aperture 20 through which the nozzle N of a cartridge C projects. Components of the dispensing gun mounted within the drive enclosure 16 include a DC brush motor (not shown), a motor controller (discussed below), a drive linkage (not shown), and a drive rod 30. The dispensing gun 10 utilizes a rack and pinion mechanism (which includes the drive rod 30 and the drive linkage) driven by the DC brush motor to drive a plunger 32 coupled to the forward end of the drive rod 30 into the back wall 34 of the cartridge C. A battery B is coupled to the handle 14. A finger-actuated trigger switch 36 is mounted on the forward side of handle 14.

Figure 2:
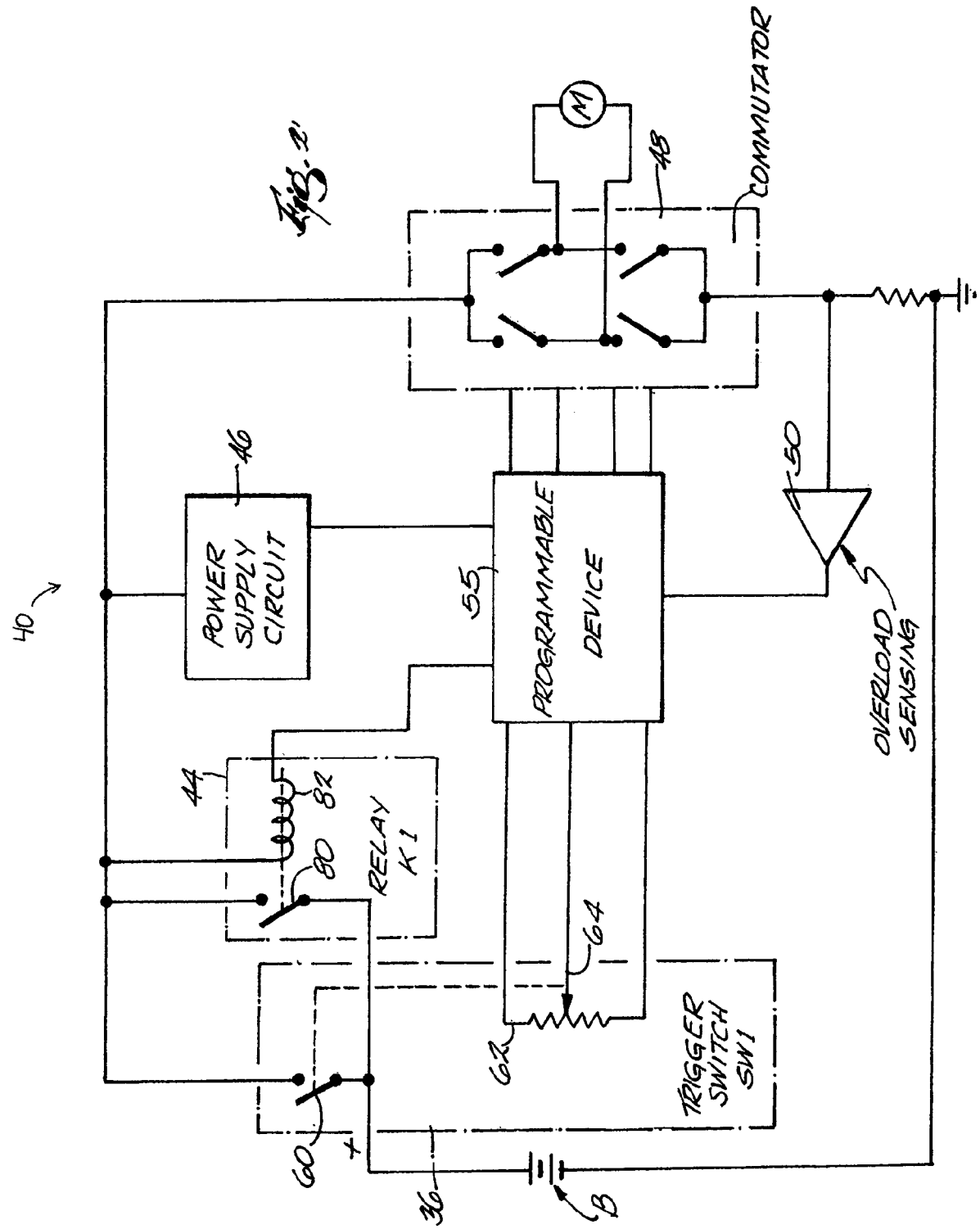
FIG. 2 is a schematic drawing of an apparatus embodying one or more independent aspects of the invention.

A motor controller 40 embodying independent aspects of the invention is shown in FIG. 2. The motor controller 40 can be powered by a variety of sources, such as, for example, a cordless power tool battery (e.g., 12 volt, 14.4 volt, 18 volt, etc.). The motor controller 40 generally includes the trigger switch 36, a zero battery drain/auxiliary power circuit 44, a power supply circuit 46, a commutator 48, an overload sensor 50, and a programmable device 55. The motor controller 40 controls a motor M, which in the illustrated embodiment is a DC brush motor. The functional blocks of FIG. 2 correspond to the blocks shown in broken lines in the detailed circuit schematic of FIG. 3.

The trigger switch 36 is coupled to the battery B and includes a main power on/off switch 60 and a potentiometer 62 having a wiper 64. The operator inputs control information to the motor controller 40 through the trigger switch 36. The main power on/off switch 60 is closed when the operator depresses the trigger switch 36 and the main power on/off switch 60 remains closed until the operator releases the trigger switch 36 to a predetermined point. The main power on/off switch 60 electrically couples the motor controller to the battery B when it is closed. The distance the operator depresses the trigger switch 36 correlates to the movement of the wiper 64 on the potentiometer 62.

Figure 3:
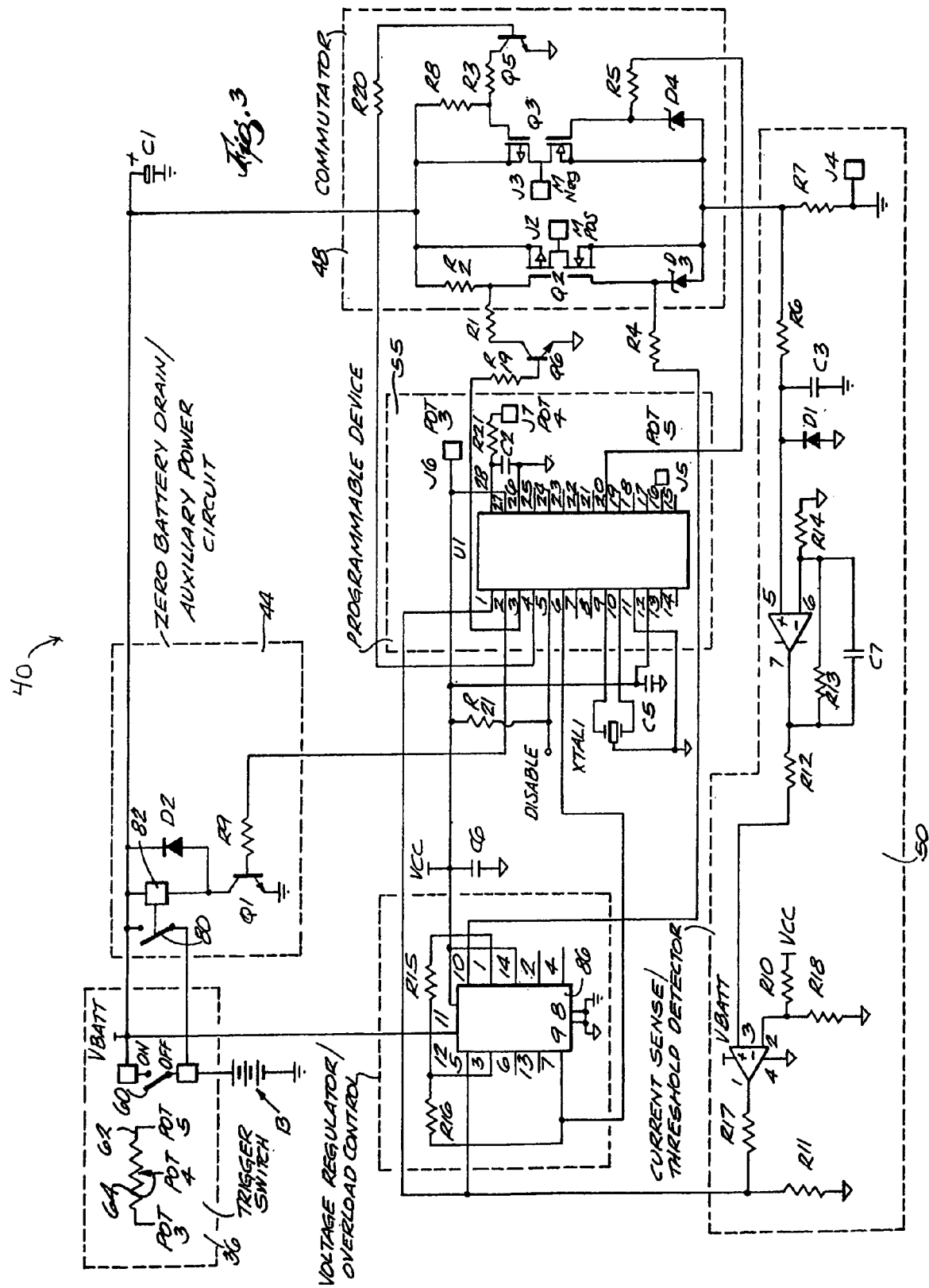
FIG. 3 is a detailed circuit diagram of an apparatus embodying one or more independent aspects of the invention.
Figure 5:
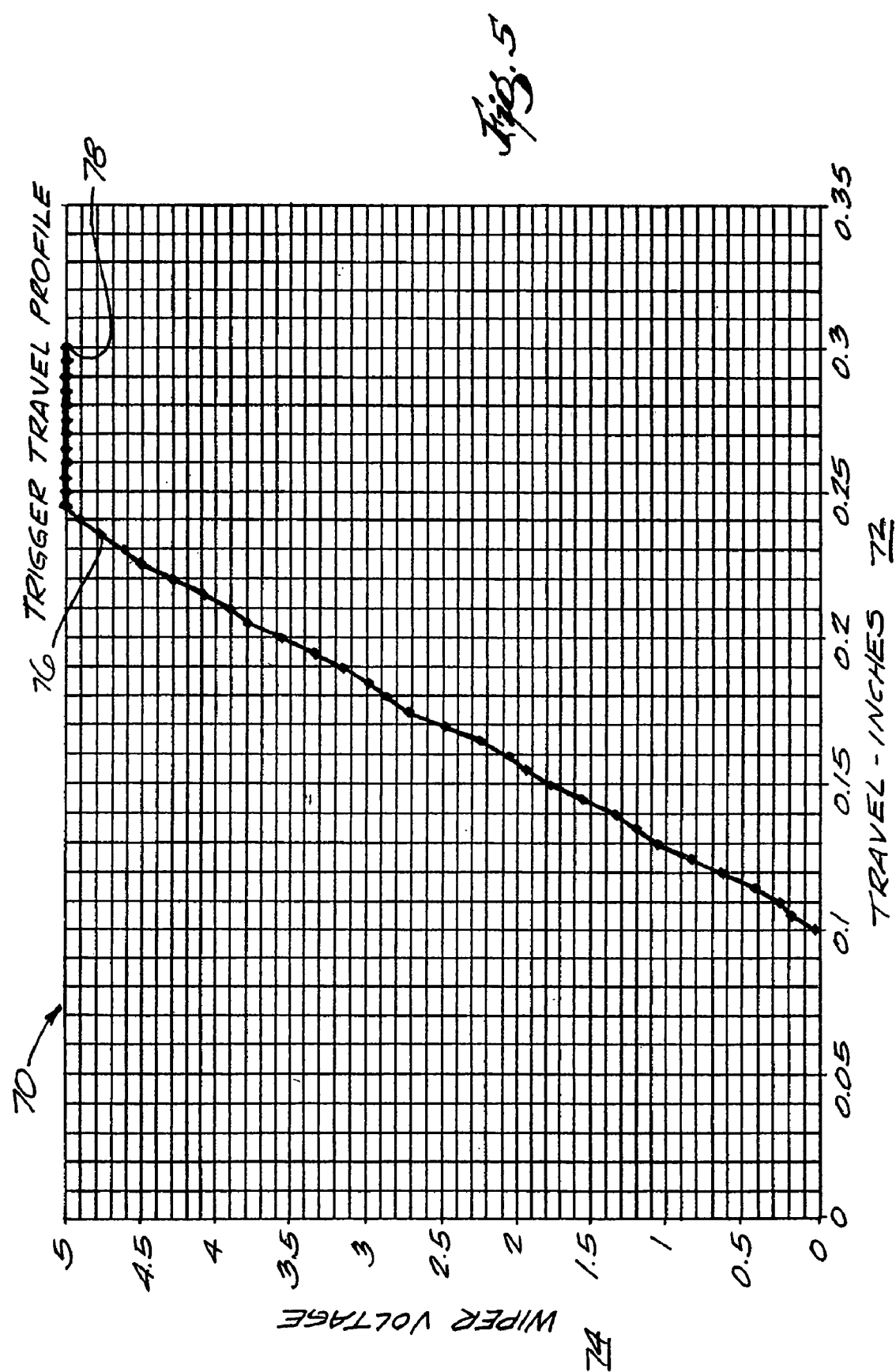
FIG. 5 is a graph of potentiometer (wiper) voltage versus travel.

As best seen by reference to FIG. 3, the electromotive force or voltage output by the potentiometer is based on the wiper voltage, at node POT 4, with respect to the voltages at nodes POT 3 and POT 5. Node POT 5 is the wiper ground reference and node POT 3 is equivalent to the upper rail voltage VCC supplied to the programmable device 55, which in one embodiment is 5 volts. The programmable device sets the wiper ground reference, node POT 5, to 0 volts to utilize the full 0–5 volt range for determination of operator actuation of the trigger switch 36. The full range of voltage is desirable for greatest resolution in determination of the trigger position. The farther the operator depresses the trigger switch, the greater the reading of the wiper voltage at node POT 4 will be. FIG. 5 illustrates a graph 70 having a horizontal axis 72 (travel), vertical axis 74 (voltage), and a curve 76. As can be seen by reference to curve 76, the trigger switch 36 exhibits a substantially linear response of wiper voltage versus travel. The curve 76 illustrates that the operator must depress the switch a certain distance before a wiper voltage is produced (a threshold voltage). One embodiment requires that the wiper voltage reading at node POT 4 be at least one volt before the commutator 48 receives a control signal to drive the motor in the forward direction. This minimum turn-on voltage requirement is utilized to prevent tool operation due to an unintended trigger actuation. The motor controller 40 is also designed such that a wiper voltage reading of below 0.2 volts is necessary to deactivate the motor M (the commutator no longer receives a control signal from the programmable device 55 to drive the motor in the forward direction).

The transition from and variability between a high turn-on voltage and a low cut-off voltage (or hysteresis) is utilized in the invention to prevent the nuisance of on-off cycling of the tool when the operator is attempting to finely feather the material onto a work surface. If hysteresis was not utilized, the motor controller might instruct the commutator to reverse the direction of the motor (as discussed in greater detail below) when the operator only intended to slightly reduce the speed of the flow of material. The lower turn-off voltage allows the operator to operate the tool just above the minimum turn-on voltage and then reduce the speed to a certain degree when necessary to achieve desired material delivery results. The operator can vary the distance the trigger switch 36 is depressed during operation of the tool to vary the speed at which material is dispensed. As illustrated by FIG. 5, when the trigger switch is fully depressed the maximum wiper voltage is obtained (see point 78). The maximum wiper voltage correlates to the maximum speed at which the motor M will operate. Once the 1 volt minimum turn-on voltage requirement is met, 0.2 volts correlates to the minimum speed at which the motor will operate.

The zero battery drain/auxiliary power circuit 44 is coupled in parallel to the main power on/off switch 60 and includes a secondary switch 80 and a relay 82. The secondary switch 80 is utilized to electrically couple the motor controller 40 to the battery B during reversal of the motor. The motor controller 40 is designed to automatically reverse the motor when the operator has released the trigger switch and other conditions (discussed below) have been met. When the trigger switch 36 is released the main power on/off switch 60 will be opened and does not electrically couple the motor controller 40 to the battery B. However, since the secondary switch 80 is mounted in parallel to the main power on/off switch 60, the secondary switch 80 is capable of electrically coupling the motor controller 40 to the battery B. To avoid the nuisance of the motor M automatically reversing when not necessary, such as after an unintended trigger actuation, the secondary switch 80 is closed only if the operator depresses the trigger switch a minimum distance for a certain amount of time. Although these settings could be varied depending upon the application at hand, in one embodiment, the programmable device 55 does not send a control signal to the relay 82 to close the secondary switch 80 until a one volt wiper voltage is read for a minimum of two seconds. The secondary switch 80 then remains closed until the programmable device 55 sends a control signal to the relay 82 to open the secondary switch 80. This control signal is sent after the motor M has been reversed for the predetermined amount of time. When the secondary switch is opened the motor controller 40 is not electrically coupled to the battery B and the battery drain is reduced to zero.

The power supply circuit 46 is coupled to the main power on/off switch 60, the secondary switch 80, the overload sensor 50, the commutator 48, and the programmable device 55. The power supply circuit 46 is included in an integrated circuit 86 (see FIG. 3) that serves not only as a voltage regulator for the programmable device, but also as a level shifter for the pulse-width modulation signal for the commutator, and a current limiting control. The voltage regulator portion of the integrated circuit 86 converts the cordless tool battery voltage into the appropriate upper rail voltage VCC for the programmable device. The integrated circuit 86 for one preferred embodiment is a Texas Instruments TL3843 Current-Mode PWM Controller.

Figure 6:
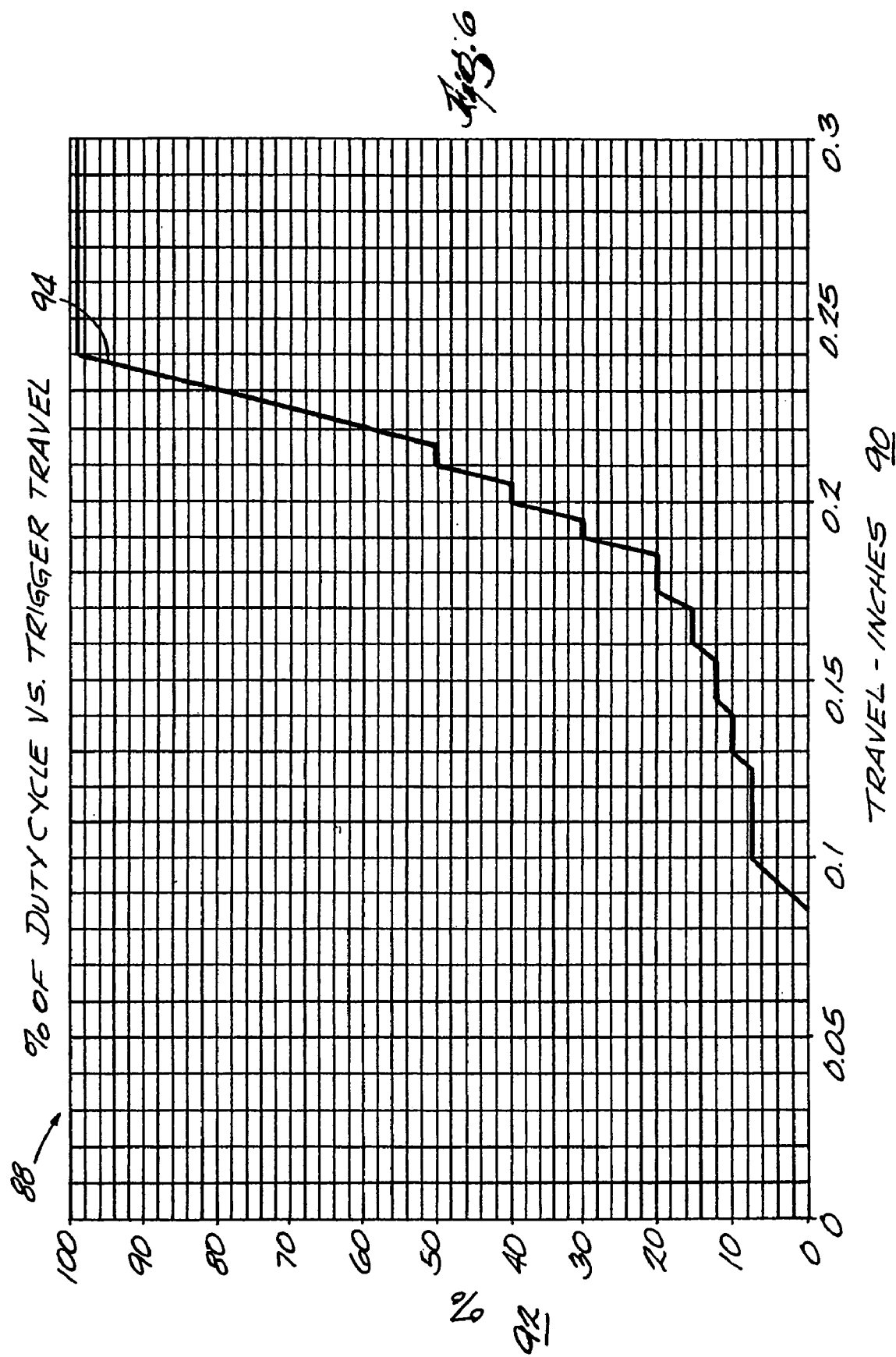
FIG. 6 is a graph of duty cycle versus trigger travel.

A commutator suitable for use in the illustrated construction is an H bridge, a specific example of which is a solid state dual MOSFET bridge. The commutator 48 is coupled to the motor M and controlled by the programmable device 55. When the motor M is being driven in the forward direction, a high side P-Channel MOSFET Q3 remains fully on to reduce power dissipation, and a low side N-Channel MOSFET Q2 is driven by a pulse-width modulation signal of varying duty cycle from the circuit 86. The duty cycle of the pulse-width modulation signal correlates to the distance the trigger switch 36 is depressed by the operator and, therefore, correlates to the speed at which the operator desires to dispense material. The higher the desired speed of the tool is, the closer to 1 the duty cycle of the pulse-width modulation will be. FIG. 6 illustrates a graph 88 with a horizontal axis 90 (travel), vertical axis 92 (percentage of duty cycle), and a response curve 94. The response curve 94 of FIG. 6 (percentage of duty cycle versus the travel of the trigger switch) is not linear (in contrast to the response of the wiper voltage versus the travel of the trigger switch illustrated in FIG. 5). The programmable device 55 utilizes a look-up table to correlate the wiper voltage reading to the appropriate duty cycle. The exponential type response of the response curve 94 is utilized for greater resolution of motor speed at the low end of trigger travel. The high degree of resolution assists the operator in delivery of the material to the desired surface. Especially for an inexperienced operator who is not completely oriented to the tool, the exponential response allows the operator to lay a more uniform bead of material. When the motor M is driven in the reverse direction the high side P-Channel MOSFET Q3 and the low side N-Channel MOSFET Q2 are turned fully on to provide a full power reverse direction of the motor M for the predetermined amount of time. The motor M is driven in reverse until the commutator 48 and the motor controller 40 are removed from electrical interconnection with the battery B, which occurs when the secondary switch 80 is opened.

The overload sensor 50 is coupled to the commutator 48 and the circuit 86. A current sense resistor samples the motor current directly. The sampled current is then filtered and conditioned. The maximum current draw by the DC brush motor in one embodiment is 3.0 amps. When the motor current is below this threshold, the threshold detector and current sense circuitry of the overload sensor 50 deliver a logic state 0 signal to I/O pins of the circuit 86 and the programmable device 55. If the I/O pin logic state is 0, the motor M is driven at the current pulse-width modulation duty cycle. If the motor current is above the maximum current draw threshold, the threshold detector and current sense circuitry deliver a logic state 1 signal to the I/O pins of the circuit 86 and the programmable device 55. The current limiting control circuitry of the circuit 86 adjusts the pulse-width modulation duty cycle to limit the current delivered to the motor M to the predefined maximum current draw. The programmable device 55 begins to decrement a timer such as a two second timer. If the timer is depleted, the programmable device 55 takes over the current limiting control function by folding back the current of the motor to 10% of the maximum current draw value. Once current limiting control is taken over by the programmable device 55, the only way the operator can regain control of the tool speed is by fully releasing the trigger switch 36, which resets the motor controller 40.

One purpose of the overload sensor 50 is to prevent a force greater than 500 lb/in$^2$ from being applied by the plunger to the back wall 34 of the cartridge C. The battery-operated dispensing gun 10 illustrated in FIG. 1 is capable of producing approximately 2600 lb/in$^2$ of force deliverable by the plunger. If an operator of the dispensing gun was able to utilize all of this force the cartridge could burst with a resultant mess and loss of material. The likelihood of such a mishap increases when the material in the cartridge has a low viscosity, the material is frozen, or the nozzle N is plugged. The motor controller 40 is designed to cut back power of the drive mechanism if an overload condition persists. Regardless of how far the operator depresses the finger actuated trigger switch 36, the motor M will only be driven at 10% of maximum power if an overload condition is recognized for more than two seconds.

The programmable device 55 is coupled to the power supply circuit 46, the potentiometer 62, the commutator 48, the relay 82, the zero battery drain/auxiliary power circuit 44, and the overload sensor 50. The programmable device 55 is operable to sense the actuation and deactuation of the main switch 60, read an electromotive force from the potentiometer 62, and upon sensing deactuation of the main on/off switch, send a control signal to the commutator 48 to reverse current flow therethrough for a predetermined amount of time. After the current has been reversed through the commutator 48 for the predetermined time, a different control signal is sent to the relay 82, which opens the secondary switch and disconnects the motor controller 40 from the battery B. Power to the motor controller 40 is shut off so the battery B is not drained when the tool is not in use. In the preferred embodiment, the programmable device 55 is a Zilog 16 MHz Z86C83 micro-controller.

Figure 4:
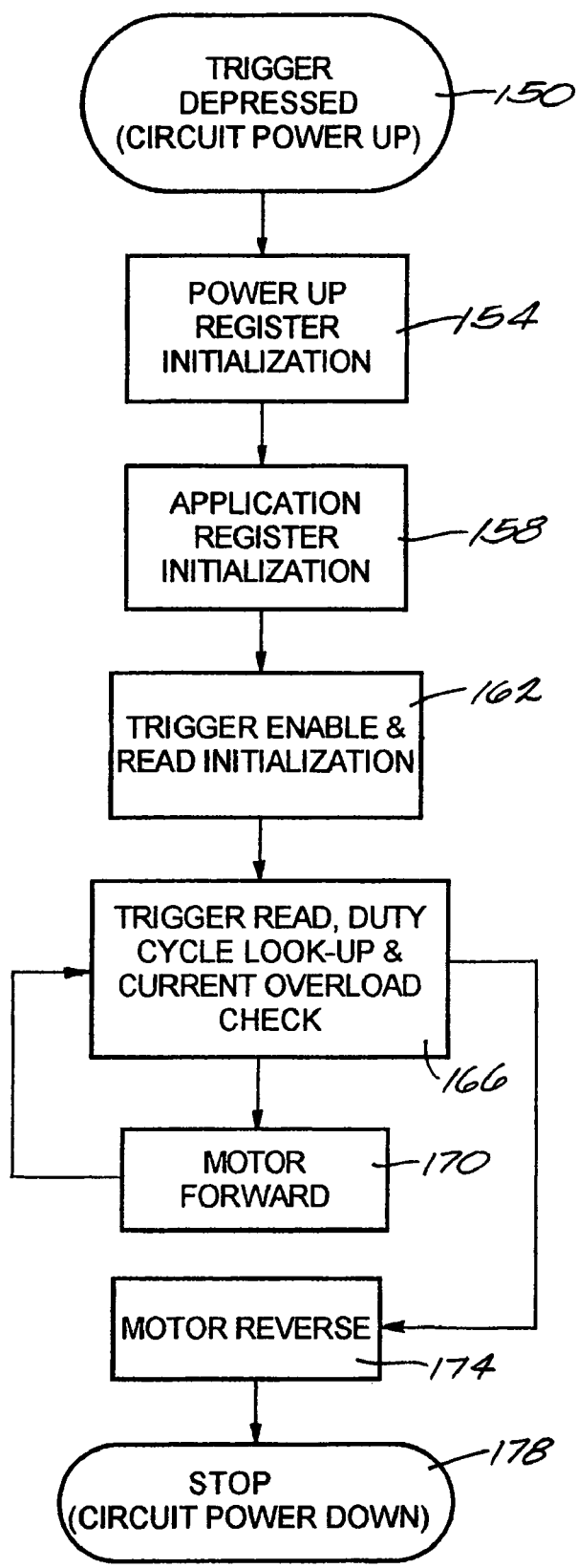
FIG. 4 is a flow chart of software used in one or more independent aspects of the invention.

The software used by the programmable device 55 to operate the motor controller 40 is illustrated in the flow chart of FIG. 4. Before the software is executed, the motor controller 40 is powered up. In order to power up the motor controller 40, the operator must depress the trigger switch 36 as shown in step 150. The main power on/off switch 60 is closed when the trigger switch 36 is depressed, coupling the battery B to the motor controller 40.

As shown at step 154, Power Up Register Initialization, the software performs initialization by setting-up and configuring the system registers of the programmable device 55. The system registers include the hardware port control registers, port I/O registers, various timer registers, and the interrupt control registers. The programmable device 55 system registers are used for operation of the programmable device 55 and for interfacing of the programmable device 55 with the other components of the motor controller 40.

As shown at step 158, Application Register Initialization, the software clears all general-purpose programmable device registers and sets up and configures programmable device registers used for the automatic motor reversal application. Registers are specifically initialized with values for TRIGGER ON TIME, TRIGGER READ TIME, and CURRENT OVERLOAD TIME. The registers initialized with these values act as timers that can be decremented once a certain condition is met. For example, TRIGGER ON TIME is initialized to 2000, which corresponds to two seconds. If the programmable device 55 senses the main power on/off switch 60 is on and the potentiometer wiper voltage is greater than one volt, the TRIGGER ON TIME timer is decremented. If the above conditions continue and the TRIGGER ON TIME timer is depleted, the secondary switch is closed and the programmable device 55 performs a motor reverse.

As shown at step 162, Trigger Enable and Read Initialization, the software initializes the registers that are required to perform analog-to-digital conversion of the wiper voltage (node POT 4) read from the potentiometer 62. The software also enables the external trigger switch potentiometer wiper ground reference pin, which is electrically coupled to a pin of the programmable device 55. The pin is set to the logic 0 state. Setting the potentiometer ground to the logic 0 state allows for a full 0–5 volt range to be applied to the trigger switch potentiometer wiper. Allowing for the full five-volt range increases the resolution of speed control the operator can achieve.

As shown at step 166, Trigger Read, Duty Cycle Look-up and Overload Check, the software executes functions that occur during normal operation of the tool. Specifically, the software performs a read of the current trigger switch position, determines a new pulse-width modulation duty cycle for driving the motor, and checks the overload sensor.

The Trigger Read aspect of step 166 performs an analog-to-digital conversion of the voltage (node POT 4) read from the trigger switch potentiometer wiper. The wiper voltage will range from 0–5 volts. The current trigger position corresponds to the wiper voltage read, 0 volts corresponds to a trigger switch that is fully released or inadvertently slightly depressed (less than 0.1 inches), and 5 volts corresponds to a fully depressed trigger switch. The result of the analog-to-digital conversion is analyzed to determine if code execution should transfer back to perform further analog-to-digital conversions of the wiper voltage, perform a Duty Cycle Look-up, or perform a motor reverse.

If the software determines that the wiper voltage (node POT 4) is greater than the minimum turn-on level, a Duty Cycle Look-up executes. The software determines what the duty cycle should be for the current trigger switch position. The current wiper voltage obtained in the Trigger Read is compared to a stored, predefined table of wiper voltages and corresponding duty cycle values. When the current wiper voltage matches a voltage in the look-up table, the value of the duty cycle associated with that voltage is stored in a timer register. This timer register is used to control an internal timer used in step 170, Motor Forward, to control the duty cycle of the pulse-width modulation signal that drives the low side N-channel MOSFET Q2.

If a Duty Cycle Look-up is performed then the condition has been met for the TRIGGER ON TIME timer to be decremented. If the value of the wiper voltage obtained via a Trigger Read remains above the turn-on level until the TRIGGER ON TIME timer is depleted, the programmable device 55 sends a control signal to the relay 82 to close the secondary switch 80. After the secondary switch 80 has closed, if the trigger switch is fully released, execution transfers to step 174, Motor Reverse. If the wiper voltage does not reach the minimum turn-on voltage for the defined time, execution is not transferred to step 174.

Once the above steps are completed, an overload condition check is conducted on the motor M. The current draw of the motor is to be kept under the maximum current draw to limit the force the plunger exerts on the back wall 34 of the cartridge C. The software performs this operation by checking the logic state of the I/O pin connected to the overload sensor 50. If the software detects a logic state 0, no further action is performed and code execution is transferred to step 170, Motor Forward. If the software detects a logic state 1, the CURRENT OVERLOAD TIME timer initialized in step 158 is decremented and execution is transferred to step 170. If the software detects a logic state 1 at the I/O pin connected to the overload sensor 50 long enough to deplete the timer, a predefined, relatively low duty cycle is loaded into the internal timer register. Once the predefined duty cycle is loaded into the internal timer register no further duty cycle lookups are performed. Rather, the duty cycle is fixed at the predefined low level to prevent motor overload. The duty cycle stays in this state until the operator fully releases the trigger switch 36, thereby resetting the motor controller 40. Execution is similarly transferred to step 170 to perform the Motor Forward control. However, as explained above, the speed of the motor will only be at 10% of full power.

At step 170, Motor Forward, the software configures and sends appropriate signals to the I/O pins that control the commutator 48 and generates the duty cycle. After the software has configured the I/O pins for forward operation of the motor M, the software turns the high side P-Channel MOSFET Q3 fully on to reduce power dissipation. The software sends a pulse-width modulation signal to the low side N-Channel MOSFET Q2 to provide a variable speed function. The duty cycle of the pulse-width modulation signal is determined by using the duty cycle from the look-up table loaded into the internal timer at step 166. After a single period of the duty cycle is completed, the software decrements the TRIGGER READ register counter initialized in step 158 and returns to step 170 and performs another period of the duty cycle. Once the TRIGGER READ register counter is depleted, execution is transferred back to step 166. A new trigger switch position is then determined and, if the value of the wiper voltage is above the turn-on level, a new duty cycle is determined from the look-up table. The new duty cycle is loaded into the internal timer register. Code execution is then again transferred back to step 170 with the new duty cycle loaded and the motor control I/O pin timing adjusted accordingly. This cycle repeats itself until one of the conditions noted causes the cycle to end.

At step 174, Motor Reverse, the I/O pins that control the commutator 48 and disable the relay 82 are configured. After the software has configured the pins for reverse operation of the motor M, the software turns on the high side P-Channel MOSFET Q3 and the low side N-Channel MOSFET Q2 fully for a predefined time. The predefined time of the preferred embodiment is 0.5 seconds. The predefined time needs to be long enough to drive the plunger in reverse until it is no longer in contact with the back wall of the cartridge C. It is advantageous to reverse the motor only long enough to move the plunger from contact with the back wall 34 of the cartridge C. If the motor reverses further than the necessary distance, time is wasted driving the plunger forward to the back wall of the cartridge when the operator wishes to resume use of the tool. The predefined time is stored in a timer register initialized in step 158. Once that timer register is depleted, the software sends a control signal to the relay 82, disabling the relay 82 and thereby opening the secondary switch 80. These actions disconnect the motor controller 40 from electrical interconnection with the battery B. The motor controller is powered down when the tool is not being used to prevent unnecessary draining of the battery power.

In addition to the features noted above, the controller 40 may be configured with additional features such as an auto-reverse disable mechanism, a nozzle blowout mechanism, and a software trigger lock. As best seen by reference to FIG. 3, the programmable device 55 has several available input pins that may be used to input additional information regarding desired operating features. For example, the programmable device 55 may receive a disable signal from a switch (not shown) or similar device along a disable line DISABLE. Upon reading a signal on the pin associated with the disable signal, the programmable device, when properly programmed to react to the condition of having a disable signal, deactivates, or ignores those conditions that cause the device to reverse the motor when the trigger switch is released. An auto-reverse disable feature might be useful when a dispensing gun is used at low speeds to apply small amounts of material.

In addition to a disable switch, a nozzle blowout input could be supplied through a switch (not shown) or similar mechanism to override the current overload functions of the invention. When so configured, the controller 40 would allow an operator to apply maximum current to the motor and, therefore, maximum force to the plunger to forcefully drive the back wall of the cartridge. Such a feature would be useful to clear a plugged nozzle of a cartridge. Finally, the controller could be configured with a software trigger lock. Such a lock could be configured such that the tool would not operate until appropriate inputs from the trigger switch or other inputs mechanisms were received by the programmable device 55. Such a trigger lock would enhance safety by reducing inadvertent actuation of the device controlled by the controller 40. A software trigger lock could also act as a theft deterrence device, making it nearly impossible for individuals lacking knowledge of the software unlock inputs to use the device.

It should be apparent from the discussion above and to those of ordinary skill in the art that the exact configuration of the controller could be varied. For example, many of the individual components described above could be combined on a single integrated circuit or chip and features and components could be implemented in either hardware or software. It should also be recognized that the controller 40 could be utilized in other electric tools, not just dispensing guns, in which an automatic reverse function would be of benefit.

Figure 7:
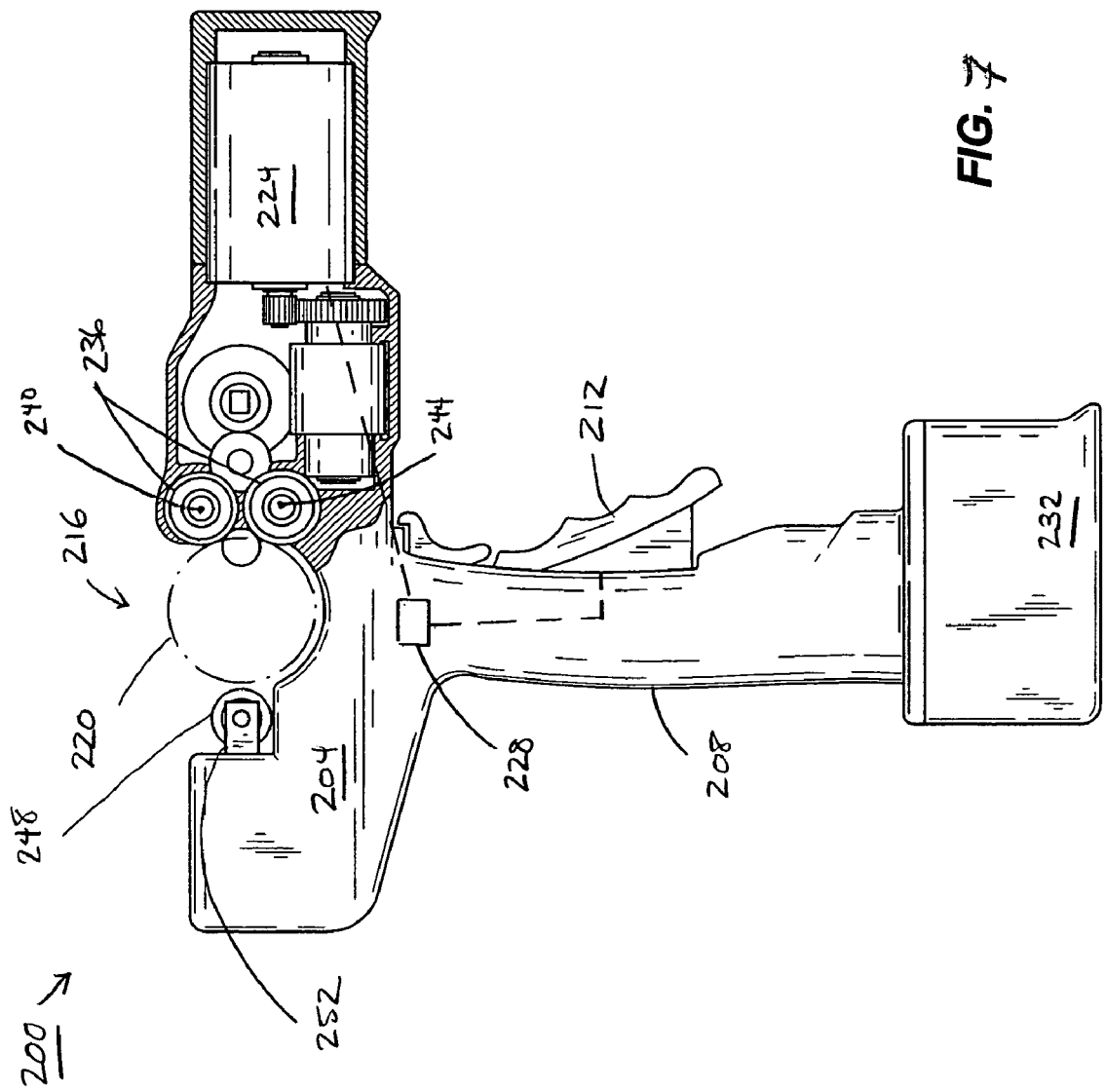
FIG. 7 is a side partial cross-sectional view of an alternate construction of power tool, such as a tube cutter.

FIG. 7 illustrates a tube cutter 200 embodying one or more independent aspects of the invention. The tube cutter 200 includes a housing 204, which is generally pistol-shaped. The housing 204 includes a handle 208 and a trigger 212.

The housing 204 includes a cradle or tube support portion 216, which supports a tubular structure 220 for a cutting process. The tube support portion 216 is configured to receive any size tubular structure. It is noted that the tubular structure 220 is not limited to having a circular cross-section but also includes structures with non-circular cross-sections.

The housing 204 supports a motor 224 (e.g., a DC motor) and a motor controller 228. The motor controller 228 is similar to or the same as the motor controller 40 described above. The motor controller 228 can include the same or similar components as the motor controller 40 and can be modified for application and use in the tube cutter 200. The motor controller 228 operates in the same or similar manner as the motor controller 40. The motor 224 and the motor controller 228 can be powered by a variety of sources such as a battery 232 (e.g., 12 volt, 14.4 volt, etc.). The battery 232 may be coupled to the handle 208.

In the illustrated construction, the housing 204 supports a tube cutting mechanism operable to cut the tubular structure 220. The tube cutting mechanism may be similar to that disclosed in U.S. Pat. No. 6,189,216, the entire contents of which is hereby incorporated by reference.

In the illustrated construction, a pair of rolls 236 is driven by the motor 224. The rolls 236 include respective axes 240, 244 that are oriented in a direction that is parallel to one another. The axes 240, 244 are also oriented in a direction that is parallel to an axis of the tubular structure 220 that is to be cut by the tube cutter 200.

In the illustrated construction, the housing 204 includes a rotatable blade 248 that is supported on a rod 252 and that can be moved into and out of engagement with the tubular structure 220 that is to be cut. Movement of the rod 252 is controlled by the motor 224. The rod 252 is moved from a start or home position (a first condition of the cutting mechanism) toward the rolls 236 until the blade 248 engages the tubular structure 220 and moves the tubular structure 220 into driving engagement with the rolls 236. The rolls 236 rotate the tubular structure 220, and the rod 252 and the blade 248 continue to advance into the wall of the tubular structure 220 until the cutting operation is complete (a second condition of the cutting mechanism). As described below, when the cutting operation is complete, the controller 228 automatically reverses direction of the motor 224 to move the rotatable blade 248 and the rod 252 away from and out of engagement with the tubular structure 220 (e.g., operating the cutting mechanism from the second condition to the first condition).

Figure 8:
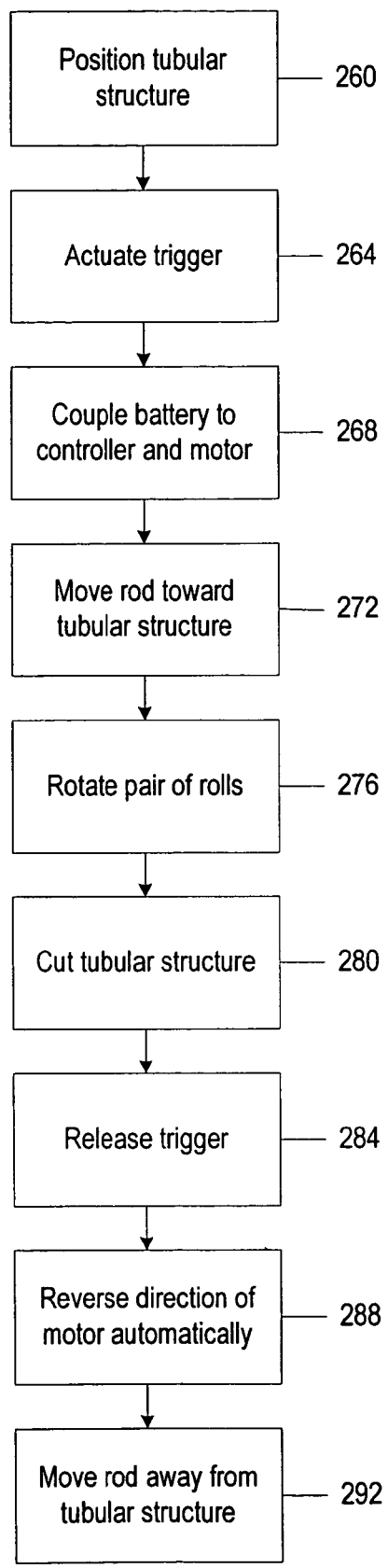
FIG. 8 is a flow chart illustrating the operation of a power tool, such as the tube cutter shown in FIG. 7.

FIG. 8 is a flow chart illustrating the operation of the tube cutter 200 to cut a tubular structure 220. The operator positions (at 260) a tubular structure 220 in the tube support portion 216. The operator actuates (at 264) the trigger 212, which couples (at 268) the battery 232 to the motor controller 228 and the motor 224. With the trigger 212 continuously actuated, the motor 224 moves (at 272) the rod 252 toward the tubular structure 220 until the blade 248 engages the tubular structure 220 and rotates (at 276) the pair of rolls 236. The rod 252 and the blade 248 continue to advance, and the blade 248 cuts (at 280) the tubular structure 220 as the tubular structure 220 is rotated.

When the tubular structure 220 is severed (the second condition of the cutting mechanism), the operator releases (at 284) the trigger 212, and the motor 224 automatically reverses (at 288) direction. The rod 252 and blade 248 automatically moves (at 292) out of engagement with the tubular structure 220 so the operator can remove the tubular structure 220 from the support portion 216. As described above with respect to the controller 40, the controller 228 operates to automatically move the rod 252 and blade 248 out of engagement with the tubular structure 220 in response to movement of the trigger 212 in the second direction (the trigger 212 being released by the operator).

It should be understood that, in some constructions, the controller 228 may determine that the cutting mechanism has reached the second condition (when the tubular structure 220 is severed) or has reached some other selected condition (e.g., a condition between the first condition and the second condition) before the controller 228 will operate to automatically return the cutting mechanism to the first condition if the trigger 212 is released. In such constructions, if the operator releases the trigger 212 (the trigger 212 is moved in the second direction) before the tubular structure 220 is cut (or before another condition has been reached), the controller 228 will not automatically reverse the motor 224 to automatically move the blade 248 out of engagement with the tubular structure 220. Rather, the cutting mechanism will remain the in the same position until the trigger 212 is again actuated.

FIGS. 9 and 10 illustrate a tube cutter 300 embodying one or more independent aspects of the invention. The tube cutter 300 includes a housing 304. The housing 304 includes a handle 308 and a trigger 312.

The housing 304 supports a motor 316 (e.g., a DC motor) and a motor controller 320. The controller 320 is similar to or the same as the motor controller 40 described above. The controller 320 can include the same or similar components as the motor controller 40 and can be modified for application and use in the tube cutter 300. The controller 320 operates in the same or similar manner as the motor controller 40. The motor 316 and the motor controller 320 can be powered by a variety of sources such as a battery 324 (e.g., 12 volt, 14.4 volt, 18 volt, etc.). The battery 324 may be coupled to the handle 308.

The housing 304 supports a cutting mechanism 328. The cutting mechanism 328 may be similar to that disclosed in U.S. Pat. Nos. 4,769,911; 4,802,278; 5,495,672; 5,836,079; 6,065,212; and 6,202,307, the entire contents of all of which are hereby incorporated by reference.

In the illustrated construction, the cutting mechanism 328 defines a closeable opening or recess 332. The cutting mechanism 328 supports a disc-like device 336 driven by the motor 316. The device 336 defines a recess 340 which is alignable with the recess 332. The recesses 332 and 340 are configured to receive any size tubular structure 352 to be cut. It is noted that the tubular structure 352 is not limited to having a circular cross-section, but also includes structures with non-circular cross-sections.

The device 336 includes a plurality of rotatable blades 344 and a plurality of rolls 348. As the device 336 is rotated, the blades 344 are advanced to cut the tubular structure 352 or retracted out of the tubular structure 352 (in response to the direction of rotation).

Figure 11:
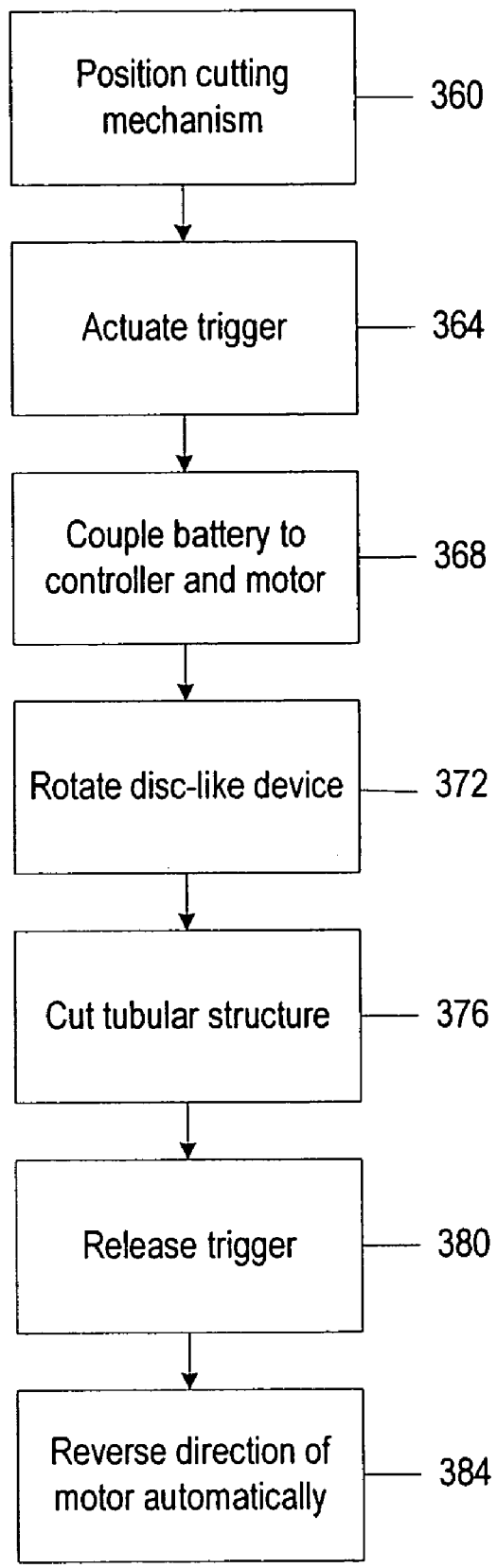
FIG. 11 is a flow chart illustrating the operation of a power tool, such as the tube cutter shown in FIGS. 9–10.

FIG. 11 is a flow chart illustrating the operation of the tube cutter 300 to cut the tubular structure 352. In a first condition of the cutting mechanism 328, the recesses 332 and 340 are aligned to receive a tubular structure 352. The operator positions (at 360) the cutting mechanism 328 (e.g., the recesses 332 and 340) on the tubular structure 352. The operator actuates (at 364) the trigger 312, which couples (at 368) the battery 324 to the motor controller 320 and the motor 316. With the trigger 312 continuously actuated, the motor 316 rotates (at 372) the device 336. As the device 336 rotates, the recesses 332 and 340 move from being aligned to partially aligned, to misaligned, to partially aligned, to aligned, etc.

The blades 344 cut (at 376) the tubular structure 352 as the blades 344 rotate with the device 336. When the tubular structure 352 is severed (the second condition of the cutting mechanism 328), the operator releases (at 380) the trigger 312, and the controller 320 causes the motor 316 to automatically reverse (at 384) until the recesses 332 and 340 are in alignment (the first condition), such that the tube cutter 300 can be removed from the tubular structure 352.

It should be understood that, when the trigger 312 is released, the controller 320 may cause operation of the motor 316 in the reverse direction to rotate the device 336 until the blades 344 are fully retracted and until the recesses 332 and 340 are aligned so that the tubular structure 352 can be removed.

It should also be understood that, in some constructions, the controller 320 may determine that the cutting mechanism 328 has reached the second condition (when the tubular structure 352 is severed) or has reached some other selected condition (e.g., a condition between the first condition and the second condition) before the controller 320 will operate to automatically return the cutting mechanism 328 to the first condition if the trigger 312 is released. In such constructions, if the operator releases the trigger 312 (the trigger 312 is moved in the second direction) before the tubular structure 352 is cut (or before another condition has been reached), the controller 320 will not automatically reverse the motor 316 to automatically align the recesses 332 and 340 and/or to automatically move the blades 344 out of engagement with the tubular structure 352. Rather, the cutting mechanism 328 will remain the in the same position until the trigger 312 is again actuated.

Figure 12:
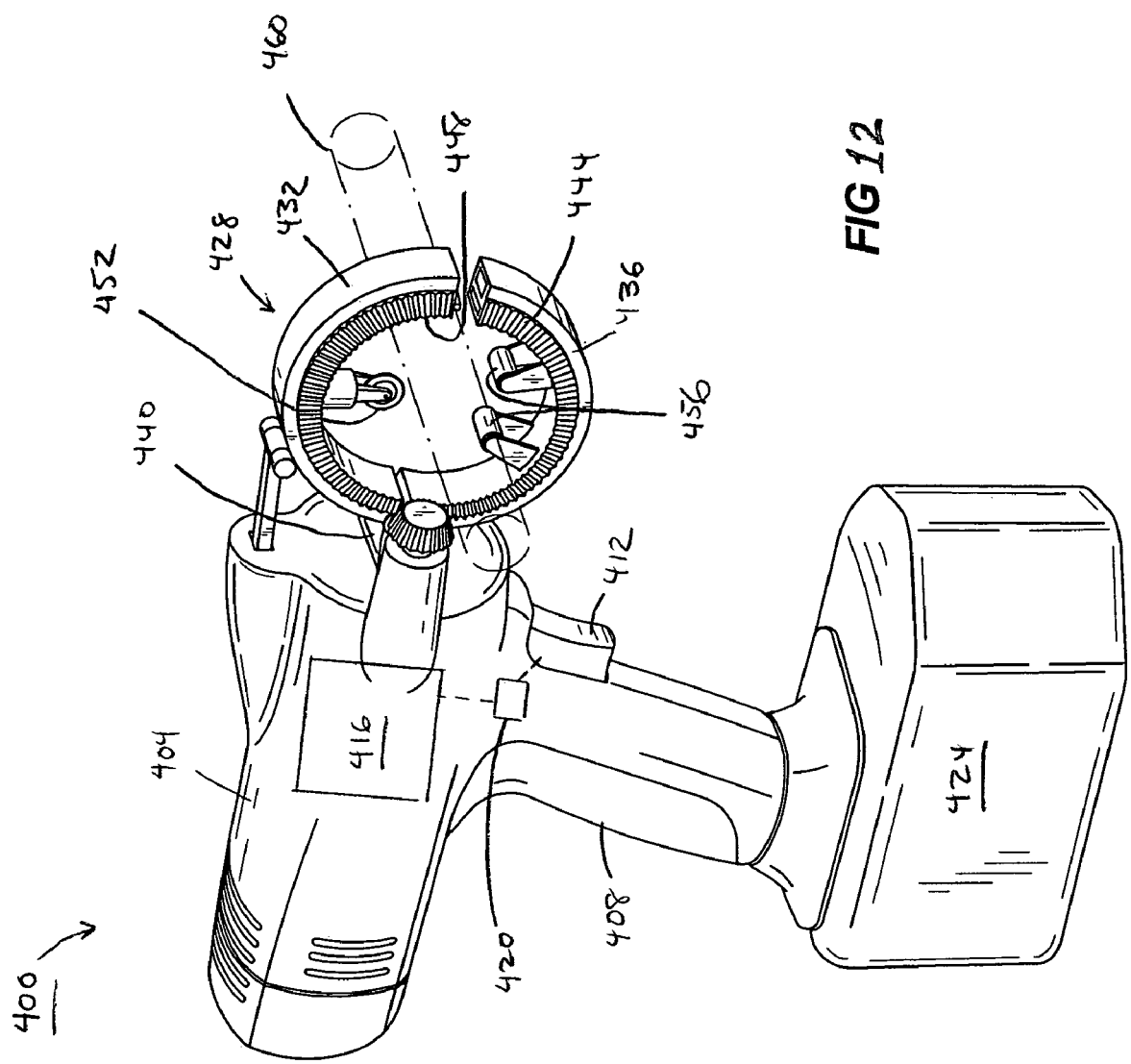
FIG. 12 is a side partial cross-sectional view of yet another alternate construction of power tool, such as a tube cutter.

FIG. 12 illustrates a tube cutter 400 embodying one or more independent aspects of the invention. The tube cutter 400 includes a housing 404. The housing 404 includes a handle 408 and a trigger 412.

The housing 404 supports a motor 416 (e.g., a DC motor) and a motor controller 420. The controller 420 is similar to or the same as the motor controller 40 described above. The controller 420 can include the same or similar components as the motor controller 40 and can be modified for application and use in the tube cutter 400. The controller 420 operates in the same or similar manner as the motor controller 40. The motor 416 and the controller 420 can be powered by a variety of sources such as a battery 424 (e.g., 12 volt, 14.4 volt, 18 volt, etc.). The battery 424 may be coupled to the handle 408.

The housing 404 supports a cutting mechanism. The cutting mechanism may be similar to that disclosed in U.S. Pat. Nos. 3,839,791; 4,762,138; 4,939,964; and 4,953,292, the entire contents of each of which are hereby incorporated by reference.

In the illustrated construction, the cutting mechanism generally includes a ring member 428 comprised of two generally semi-circular sections 432 and 436. The two sections 432 and 436 are connected by a fastener 440, which allows the section 432 to pivot with respect to the section 436 between an open position and a closed position.

In the illustrated construction, the ring member 428 supports a disc-like device 444 driven by the motor 416. The device 444 defines a recess 448. The ring member 428 and the recess 448 are configured to receive any size tubular structure 460. It is noted that the tubular structure 460 is not limited to having a circular cross-section, but also includes structures with non-circular cross-sections. The device 444 includes a rotatable blade 452 and a plurality of rolls 456.

Figure 13:
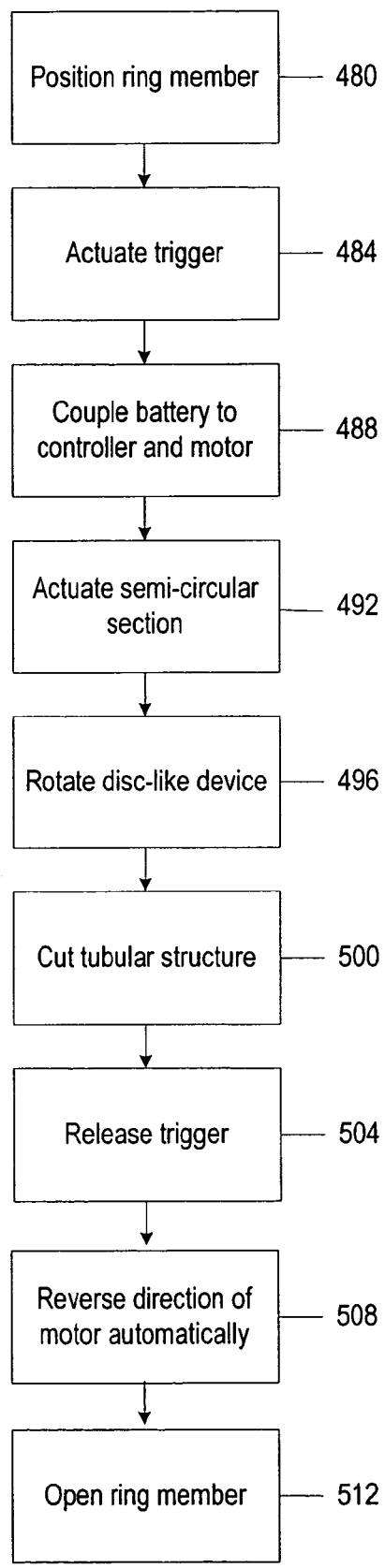
FIG. 13 is a flow chart illustrating the operation of a power tool, such as the tube cutter shown in FIG. 12.

FIG. 13 is a flow chart illustrating the operation of the tube cutter 400 the tubular structure 460. In the first condition of the cutting mechanism, the operator positions (at 480) the ring member 428 on the tubular structure 460, and the section 432 is closed and interconnected with the section 436.

The operator actuates (at 484) the trigger 412, which couples (at 488) the battery 424 to the motor controller 420 and the motor 416. With the trigger 412 continuously actuated, the motor 416 rotates (at 496) the device 444. The blades 452 cut (at 500) the tubular structure 460 as the blades 452 rotate. When the tubular structure 460 is severed (the second condition of the cutting mechanism), the operator releases (at 504) the trigger 412, and the controller 420 operates to cause the motor 416 to automatically reverse (at 508) to align the ring member 428 and the device 444, such that the tube cutter 400 can be removed from the tubular structure 460.

It should also be understood that, in some constructions, the controller 420 may determine that the cutting mechanism has reached the second condition (when the tubular structure 460 is severed) or has reached some other selected condition (e.g., a condition between the first condition and the second condition) before the controller 420 will operate to automatically return the cutting mechanism to the first condition if the trigger 412 is released. In such constructions, if the operator releases the trigger 412 (the trigger 412 is moved in the second direction) before the tubular structure 460 is cut (or before another condition has been reached), the controller 420 will not automatically reverse the motor 416 to automatically align the ring member 428 and the device 444. Rather, the cutting mechanism will remain the in the same position until the trigger 412 is again actuated.

In other constructions and in other aspects, the motor controller 40 can be used in motor braking applications in power tools, such as, for example, drills, reciprocating saws, circular saws, band saws, table saws, etc. U.S. Pat. No. 6,236,177 generally discloses a power tool including a braking and control circuit and is hereby incorporated by reference in its entirety.

There are two general categories of braking conditions, i.e., conditions in which braking of the motor M is required or desired. The first category includes safety-related braking conditions. In this category, braking of the motor M is required if an unsafe operating condition for the power tool arises. For example, such a safety-related braking condition occurs when the tool element, such as a drill bit or a saw blade, binds on the workpiece causing the workpiece to jerk or kick back. In either of these safety-related braking conditions, braking of the motor M is required to prevent injury to the operator or damage to the equipment or workpiece. Further, in such safety-related braking conditions, braking of the motor M is accomplished as quickly as possible without damaging the components of the motor M (e.g., the motor M is braked in 1 sec.).

The other category of braking conditions includes productivity-related braking conditions. In this category, braking of the motor M is desired to stop the associated tool element so that the operator can move to the next drilling or cutting operation more quickly. The operator does not have to wait for the tool element to coast to a stop before continuing operations. Such productivity-related braking can be accomplished more slowly than the safety-related braking to reduce the wear on the motor (e.g., the motor M is braked in 2 sec.). This is important because productivity-related braking occurs more frequently than safety-related braking. Generally, a productivity-related braking condition results when the operator releases the trigger and on/off switch to disconnect the motor from the power source.

The controller 40 and motor M can be modified for application and use in the various power tools and electric-powered equipment for motor braking operations. The controller 40 operates in the same or similar manner as described above for braking operations.

Figure 14:
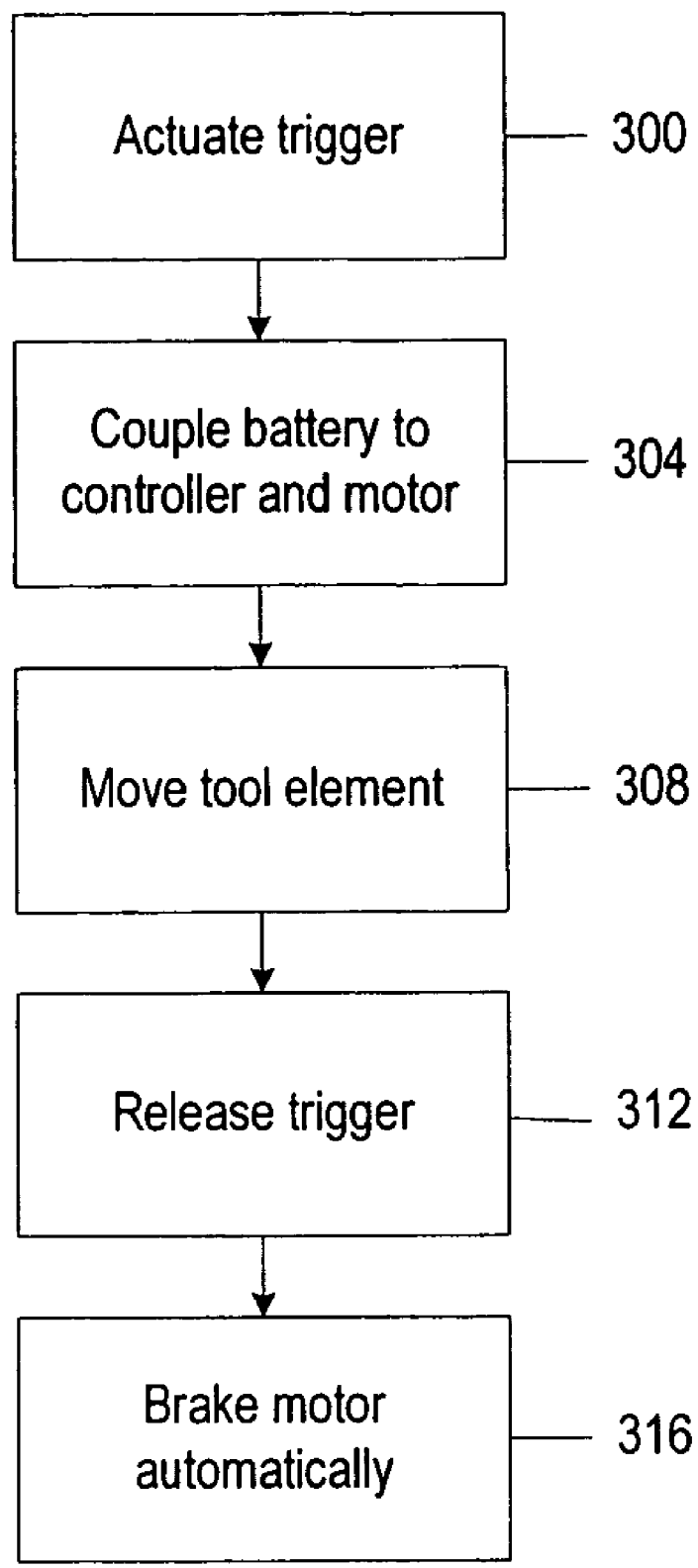
FIG. 14 is a flow chart illustrating the operation of a further alternative construction of a power tool, such as a saw.

FIG. 14 is a flow chart illustrating the operation of a braking application in a power tool or electric-powered device. The operator actuates (at 520) the trigger 36, which couples (at 524) the battery B to the motor controller 40 and the motor M. With the trigger 36 continuously actuated, the motor M moves (at 528) a tool element. When the operator releases (at 532) the trigger 36, the controller 40 operates to cause the motor M to brake (at 536) by reversing direction.

It should be understood that, in some constructions, the controller 40 may differentiate instances in which an operator has released some pressure on the trigger 36 (and allowed the trigger 36 to move in a second direction) for reasons other than stopping operation of the power tool (e.g., to change the speed of the motor M (with a variable speed switch), to adjust the grip on the power tool, etc.) from instances in which braking of the motor M is intended. In such constructions, the controller 40 may delay operation to reverse the motor M and to cause braking until the trigger 36 has moved a sufficient distance or for a given time in the second direction (the release direction). If such delay conditions are not met, the controller 40 will allow the motor M to continue driving operation of the tool element.

One or more independent features and independent advantages of the invention may be set forth in the claims.

What is claimed is:

1. A power tool comprising:
   a housing;
   a motor supported by the housing;
   a trigger switch movable in a first direction for actuating the motor in a first direction and in a second direction for actuating the motor in a second direction; and
   a secondary switch coupled in a parallel path to the trigger switch, the secondary switch being actuated a predetermined amount of time after the trigger switch is moved in the first direction, the secondary switch being deactuated a predetermined amount of time after the motor is actuated in the second direction.

2. A power tool as claimed in claim 1 wherein the trigger switch includes a main switch and a potentiometer.

3. A power tool as claimed in claim 1 wherein the power tool is a tube cutter.

4. A power tool as claimed in claim 1 wherein the power tool includes a cradle portion adapted to support a tubular structure.

5. A power tool as claimed in claim 4 further comprising:
   a blade supported for movement relative to the tubular structure; and
   a controller operable to instruct the motor to move the blade to engage the tubular structure.

6. A power tool as claimed in claim 4 further comprising:
   a blade supported for movement relative to the tubular structure; and
   a controller operable to instruct the motor to move the blade out of engagement with the tubular structure.

7. A power tool as claimed in claim 6 wherein the controller instructs the motor to move the blade out of engagement with the tubular structure upon movement of the trigger switch in the second direction for one of a predetermined amount of time and a predetermined distance.

8. The power tool as claimed in claim 1 wherein the motor brakes when the trigger switch is moved in the second direction for one of a predetermined amount of time and a predetermined distance.

9. The power tool as claimed in claim 1 wherein the motor brakes when the switch is moved in the second direction.

10. A tube cutter comprising:
    a housing adapted to support a tubular structure;
    a motor supported by the housing;
    a blade supported for movement relative to the tubular structure; and
    a controller operable to cause the blade to move into engagement with the tubular structure and to move out of engagement with the tubular structure. wherein the housing includes a first recess, wherein the tube cutter further comprises a cutting assembly including a generally circular support member adapted to be driven by the motor, the circular support member including a second recess adapted to be aligned with the first recess, and a plurality of blades supported by the circular support member, and wherein the controller is operable to instruct the motor to rotate until the first recess and the second recess are aligned.

11. The tube cutter as claimed in claim 10 wherein the controller is operable to instruct the motor to rotate in a first direction to move the blade into engagement with the tubular structure and to instruct the motor to rotate in a second direction to move the blade out of engagement with the tubular structure.

12. The tube cutter as claimed in claim 10 further comprising a trigger switch supported by the housing, the trigger switch being movable in a first direction for actuating the controller to instruct the motor to move in a first direction and in a second direction for actuating the controller to instruct the motor to move in a second direction.

13. The tube cutter as claimed in claim 10 further comprising:
    a trigger switch; and
    a battery supportable by the housing, the battery being operable to provide power to the motor and the controller upon actuation of the trigger switch.

14. A power tool comprising:
    a housing;
    a trigger switch supported by the housing, the trigger switch being movable in a first direction and in a second direction;
    a secondary switch coupled in a parallel path to the trigger switch, the secondary switch being actuated a predetermined amount of time after the trigger switch is moved in the first direction; and
    a motor supported by the housing, the motor being operable to drive a tool element when the trigger switch is moved in the first direction, the motor being operable to brake when the trigger switch is moved in the second direction.

15. The power tool as claimed in claim 14 and further comprising a controller operable cause the motor to brake when the trigger switch is moved in the second direction.

* * * * *